May 26, 1970 — R. B. POTTER — 3,513,802
APPARATUS FOR AND METHOD OF INDICATING PROGRESSIVE
FAILURE OF KEYED CONNECTION
Filed Nov. 20, 1967

Inventor
Roderick B. Potter
By Robert C. Sullivan
Attorney

United States Patent Office 3,513,802
Patented May 26, 1970

3,513,802
APPARATUS FOR AND METHOD OF INDICATING PROGRESSIVE FAILURE OF KEYED CONNECTION
Roderick B. Potter, Milwaukee, Wis., assignor to Allis-Chalmers Manufacturing Company, Milwaukee, Wis.
Filed Nov. 20, 1967, Ser. No. 684,170
Int. Cl. G01d 21/00
U.S. Cl. 116—114                                              4 Claims

ABSTRACT OF THE DISCLOSURE

In a keyed shaft and hub, a first slot is provided in the end face of the hub and a second slot of the same circumferential dimension as the first slot is carried by a keeper plate secured to the end face of the shaft. Upon initial installation of the key, the two slots are in registry and receive a feeler gauge of a predetermined dimension. Relative angular movement of the shaft and hub during operation due to progressive failure of the keyed connection causes an angular shifting of one slot relative to the other whereby a different thickness feeler gauge is insertible in the overlapped slots, the difference in thickness between the initial and subsequent feeler gauges being a measure of the relative angular movement between the shaft and the hub. In a modified embodiment, the keeper plate on the shaft and the hub are each provided with protrusions which move out of alignment with each other upon relative angular movement of the shaft and hub, whereby the relative angular movement of the shaft and hub can be measured. In a still further embodiment, particularly suited for but not restricted to a shaft and hub having a pinned connection therebetween and without a keeper plate, the shaft and hub are provided with radial index slots which are initially in registry but which move out of registration upon relative angular movement of the shaft and hub. A feeler gauge is used to measure the relative angular movement.

BACKGROUND OF THE INVENTION

Field of the invention

This invention relates to key connected shafts and hubs and more particularly to an apparatus and method for indicating and measuring angular motion between a keyed shaft and hub as an indication of the progressive failure of the key prior to final failure thereof.

Description of the prior art

Keyed connections between shafts and hubs are often subject to progressive failure due to load stresses thereon, with the result that the keyed connection frequently fails at an inopportune time. It is often desirable that the key fail upon the occurrence of a predetermined excessive overload condition. In either case, it is desirable to have some indication of the occurrence of a progressive failure of the key in advance of the final failure thereof, since a key in which there has been some degree of progressive failure will ultimately fail at some overload less than its maximum overload rating when new. Thus, when some progressive failure of the key has been indicated, as by the apparatus and method of the present invention, a new key can be inserted before ultimate failure of the key, thereby avoiding failure of the original key prematurely, or under inconvenient circumstances, or at an overload torque lower than the desired and originally rated maximum.

SUMMARY OF THE INVENTION

Accordingly, it is an object of this invention to provide an apparatus for and method of indicating progressive failure of a keyed connection between a hub and a shaft prior to ultimate failure of the keyed connection.

It is another object of the invention to provide an apparatus for and method of indicating the degree of progressive failure of a keyed connection prior to ultimate failure of the keyed connection which is accurate and economical.

In achievement of these objectives, there is provided in accordance with an embodiment of this invention an apparatus for and method of indicating progressive failure of a keyed connection in accordance with which a keeper plate is secured to the end of a shaft to which a hub is keyed, the keeper plate and the hub each being provided with a slot therein, which slots are located in registry with each other when the keyed shaft and hub are placed in operation with a new key therebetween. At the time of the initial registration of the slot in the keeper plate with the slot on the hub, a feeler gauge having a predetermined circumferential thickness equal to that of the slots is inserted in the aligned slots to maintain the slots in registration while the screws which secure the keeper plate to the shaft are being tightened. Upon the occurrence of the progressive failure of the key member due to load stresses, there is an angular motion or "creeping" between the shaft and the hub whereby there is a relative angular or circumferential displacement between the slot in the keeper plate and the slot in the hub so that the two slots are no longer in registration with each other but instead there is an overlapping of one slot with respect to the other slot. This provides a new or "resultant" slot having a different and lesser circumferential thickness than the initial slots when in registration. The "resultant" slot width at the interface between the two slots which is produced by the overlapping of the respective slots in the keeper plate and the hub can be measured by insertion of another feeler gauge having a lesser thickness than the original feeler gauge. The difference between the initial feeler gauge thickness and the thickness of the feeler gauge used for the later measurement is in direct proportion to the angular motion which has occurred between the shaft and hub.

In a modified embodiment, instead of using slots as just described, protrusions are positioned on the keeper plate and on the hub so as to move in contiguous paths upon relative movement between the keeper plate and the hub, with the amount of relative movement being measurable by a micrometer, calipers or the like as an indication of the relative angular movement between the hub and the shaft.

In a still further embodiment, particularly suited for but not restricted to a shaft and hub having a pinned connection therebetween and without a keeper plate, the shaft and hub are provided with radial index slots which are initially in registry but which move out of registration upon relative angular movement of the shaft and hub. A feeler gauge is used to measure the relative angular movement.

BRIEF DESCRIPTION OF THE DRAWINGS

Further objects and advantages of the invention will become apparent from the following description taken in conjunction with the accompanying drawing in which.

DESCRIPTION OF THE PREFERRED EMBODIMENT

Figure 1:
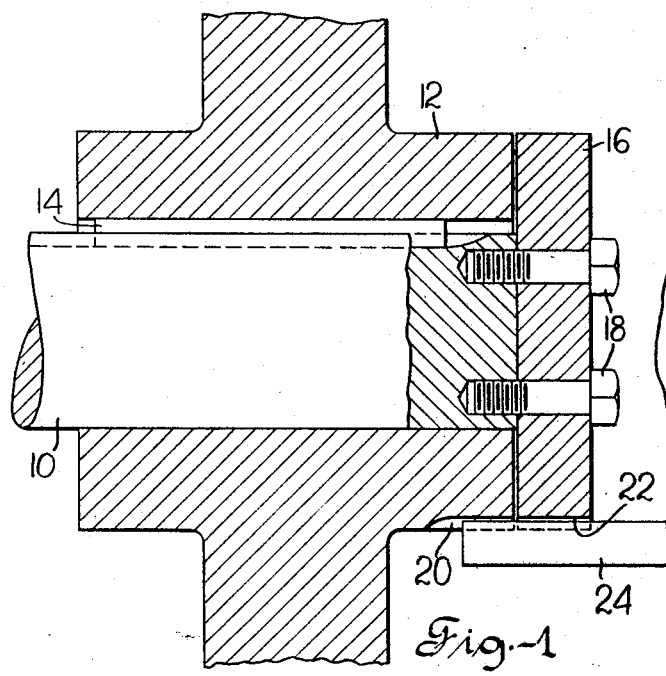
FIG. 1 is a view in longitudinal section of a keyed shaft and hub embodying the invention.
Figure 2:
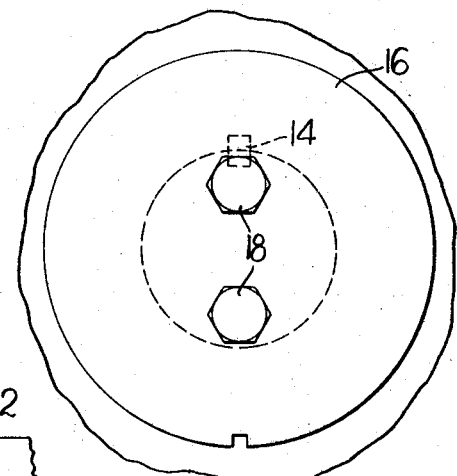
FIG. 2 is an end elevation view of the apparatus of FIG. 1.

Referring now to the drawing and more particularly to FIGS. 1 and 2, there is shown a shaft generally indicated as 10 having a hub generally indicated at 12 positioned thereon. Shaft 10 and hub 12 are secured in keyed relation to each other by a key member 14 which extends axially of the shaft and hub and is received in slots in the shaft and hub, as is well known in the art. A keeper or cover plate 16 having the same outer diameter as hub 12 is secured by screws 18 to the end face of shaft 10. Keeper plate 16 serves to hold hub 12 in position on shaft 10, in addition to a further function which will now be described.

In accordance with the invention, an axially extending slot 20 is formed in the outer periphery of hub 12 and a similar axially extending slot 22 of equal circumferential dimension to slot 20 is formed through the peripheral edge of keeper plate 16. Slots 20 and 22 define index means which permit measurement of the relative angular motion of the shaft and hub.

A feeler gauge 24 having the same thickness in a circumferential direction as the slots 20 and 22 is positioned in the registering slots in order to maintain the slots in registration while the plate 16 is being tightened by screws 18 onto the end face of shaft 10.

Figure 3:
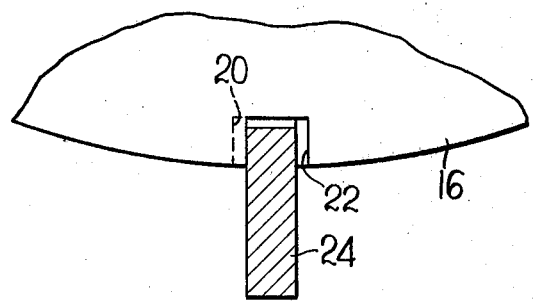
FIG. 3 is an enlarged fragmentary view showing the relative positions of the respective slots of the hub member and of the keeper plate after a relative angular displacement between these two members has occurred due to progressive failure of the key.

If, after the keyed shaft 10 and hub 12 have been in operation for a period of time, it is desired to ascertain whether there has been any angular motion of the hub and shaft relative to each other, feeler gauges are inserted in the slots 22 and 20 until a maximum permissible feeler gauge thickness is ascertained. This maximum feeler gauge thickness will be determined by the amount of relative movement which has occurred during the period of operation between the slot 20 in the end face of hub 12 and slot 22 in the keeper plate 16, as shown diagrammatically in FIG. 3, since the relative movement of these two slots with respect to each other will produce a new or resultant slot having a thickness in a circumferential direction which is less than the original slot thickness when the two slots were in perfect registration. The amount of movement which has occurred between the shaft 10 and hub 12 is determined by subtracting the new maximum feeler gauge thickness from the original maximum feeler gauge thickness when the slots were in registry.

Instead of forming the slots 20 and 22 in the hub and keeper plate prior to assembly of the keeper plate onto the shaft, an alternative method is to assemble the keeper plate onto the end of shaft 16 by means of screws 18 and to subsequently mill the slots 22 and 20 in the keeper plate and hub. This method assures perfect initial registration of the two slots 20 and 22.

Figure 4:
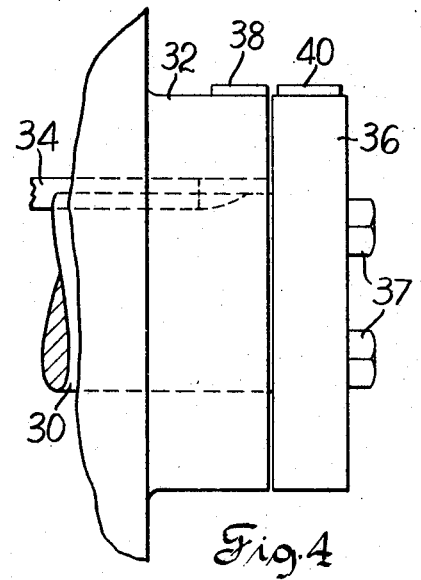
FIG. 4 is a fragmentary view in longitudinal section showing a modified embodiment in which protrusions are carried by the keeper plate and by the hub for indicating relative movement of the shaft and hub.

There is shown in FIG. 4 a modified embodiment of the invention in accordance with which protrusions on the shaft and hub serve as index means which indicate the relative angular movement of the shaft and hub. As seen in FIG. 4, shaft 30 has mounted thereon a hub 32, key 34 connecting shaft 30 and hub 32 together. A keeper plate 36 is secured to shaft 30 by means of screws 37.

In accordance with the invention, a protrusion 38 is mounted on or formed integral with hub 32 and a similar protrusion 40 is mounted on or formed integral with keeper plate 36. When hub 32 is initially keyed to shaft 30 by means of a new key, the protrusions 38 and 40 are axially aligned so that a micrometer measurement circumferentially spanning both protrusions 38 and 40 is equal to the circumferential measurement of just one of the protrusions 38 and 40.

After a period of operation of the keyed hub and shaft, if it is desired to determine whether there has been any relative angular movement of the shaft and hub, a micrometer or caliper measurement is taken of the total circumferential span of the protrusions 38 and 40. If there has been any relative angular movement of the shaft and hub, the later measurement will be greater than the original measurement, with the difference between the two measurements being directly proportional to the relative angular movement which has occurred between the shaft 30 and hub 32.

The keeper plate 16 (FIGS. 1 and 2) is preferably of circular shape and covers the entire surfaces of the end faces of the shaft and hub as shown in FIGS. 1 and 2 so as to prevent the hub from coming off the shaft. However, insofar as its function of carrying the slot 22 is concerned, keeper plate 16 need be only a small portion of the relative size shown in FIG. 1. Similarly, the keeper plate 36 of FIG. 4 need be only a small portion of the relative size shown in FIG. 4 in order to serve the function of supporting the protrusion 40.

Figure 5:
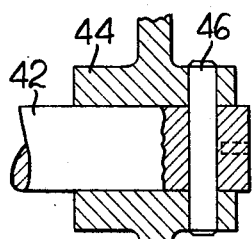
FIG. 5 is a side elevation view of a modified embodiment of the invention in which the shaft and hub have radial index slots therein.
Figure 6:
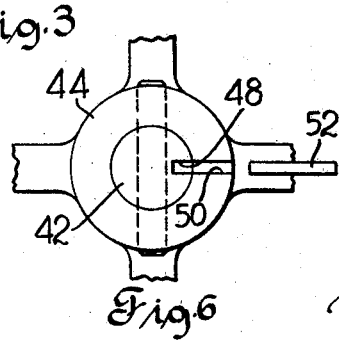
FIG. 6 is an end elevation of the embodiment shown in FIG. 5.

Referring now to FIGS. 5 and 6, there is shown a modified embodiment comprising a shaft 42 and a hub 44 secured together by a keying means in the form of a diametrically extending pin 46. Since the use of pin 46 prevents any relative axial movement of the hub and shaft, a keeper plate is not required. A radial slot 48 is provided in the shaft and a radial slot 50 is provided in the hub. When hub 44 is initially pinned to shaft 42, slots 48 and 50 are in radially aligned registration with each other and can receive a feeler gauge of a predetermined maximum thickness. If relative angular rotation of shaft 42 and hub 44 occurs due to progressive failure of the keying means (pin 46), slots 48 and 50 will move out of exact registration and will receive a feeler gauge of a different maximum thickness than originally. The difference between the thickness of the original feeler gauge and the subsequent feeler gauge is a measure of the angular movement which has occurred between the shaft 42 and hub 44.

It can be seen from the foregoing that there is provided in accordance with this invention an apparatus and method for determining progressive failure in a keyed connection between a shaft and a hub. The apparatus and method of the invention have the advantage that such progressive failure of the keyed connection can be detected and measured before final or ultimate failure has occurred. Furthermore, if the key is intended to fail at a definite value of overload torque, detection of the progressive failure of the key will avoid having the key fail at some value of overload torque less than the rated value of maximum overload torque.

It is obvious from the foregoing description and drawings that the detailed arrangement and construction of the various elements may be modified considerably without departing from the spirit of the invention which must not be considered as limited strictly to the construction shown and described.

The embodiments of the invention in which an exclusive property or privilege is claimed are defined as follows:

1. In combination, a shaft mounted for rotation, a hub mounted on said shaft, a key connecting said shaft and said hub whereby said hub rotates with said shaft, a plate-like member carried by said shaft and rotatable therewith, said member extending in radially overlying relation to the end face of said hub to retain said hub on said shaft, said member having a first index slot thereon, said hub having a second index slot thereon, said member being so located on said shaft that said first index slot and said second index slot are in substantially complete registration with each other when said key is first positioned between said shaft and said hub in an initial position of said shaft and hub, said first index slot and said second index slot moving out of complete registration with each other upon angular movement of said shaft and said hub relative to each other away from said initial position, whereby the angular movement of said shaft and said hub relative to each other may be determined by use of a feeler gauge received in said slots.

2. In combination, a shaft member mounted for rotation, a hub member mounted on said shaft member, a keying means connecting said shaft member and said hub member, whereby said hub member rotates with said shaft member, a first index slot carried by one of said members, a second index slot carried by the other of said members, said first and second index slots being in substantially complete registration with each other when said keying means is first positioned in connecting relation to said shaft member and said hub member in an initial position of said members, said first index slot and said second index slot moving out of complete registration with each other upon angular movement of said shaft member and said hub member relative to each other away from said initial position, whereby the angular movement of said shaft member and said hub member relative to each other may be determined by use of a feeler gauge received in said slots.

3. The combination defined in claim 2 in which each index slot extends axially of the respective member by which it is carried.

4. The combination defined in claim 2 in which each index slot extends radially of the respective member by which it is carried.

References Cited

UNITED STATES PATENTS

| | | | |
|---|---|---|---|
| 1,119,613 | 12/1914 | Juzek | 151—5 |
| 1,167,690 | 1/1916 | Griffin | 151—5 |
| 2,081,757 | 5/1937 | McIlvaine | 116—114 XR |
| 2,228,770 | 1/1941 | Le Tourneau | 287—53 |
| 2,317,070 | 4/1943 | Le Tourneau | 287—53 |
| 2,568,109 | 9/1951 | Beezley | 116—124 |
| 2,772,650 | 12/1956 | Cook | 116—114 XR |
| 3,190,383 | 6/1965 | Fountain | 177—137 |

LOUIS J. CAPOZI, Primary Examiner

U.S. Cl. X.R.

85—7; 151—5; 287—52.05